United States Patent
Fakiri et al.

(10) Patent No.: US 11,982,397 B2
(45) Date of Patent: May 14, 2024

(54) RESIN RICH POLYUREA-BASED INTEGRATED EXTERNAL LAYER FOR REINFORCED THERMOSETTING RESIN PIPING PROTECTION

(71) Applicant: Saudi Arabian Oil Company, Dhahran (SA)

(72) Inventors: Abderrahim Fakiri, Dhahran (SA); Md Anwar Parvez, Dhahran (SA); Gusai H. AlAithan, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 1 day.

(21) Appl. No.: 17/452,342

(22) Filed: Oct. 26, 2021

(65) Prior Publication Data

US 2023/0130880 A1 Apr. 27, 2023

(51) Int. Cl.
*B29C 70/30* (2006.01)
*B29C 70/16* (2006.01)
(Continued)

(52) U.S. Cl.
CPC ............ *F16L 9/121* (2013.01); *B29C 70/16* (2013.01); *B29C 70/30* (2013.01); *B32B 1/08* (2013.01); *B32B 5/02* (2013.01); *B32B 27/12* (2013.01); *B32B 27/40* (2013.01); *B32B 37/15* (2013.01); *C03C 25/36* (2013.01); *B29K 2063/00* (2013.01); *B29K 2309/08* (2013.01); *B29L 2023/22* (2013.01); *B32B 2250/02* (2013.01);
(Continued)

(58) Field of Classification Search
None
See application file for complete search history.

(56) References Cited

U.S. PATENT DOCUMENTS 3,594,247 A 7/1971 Pennington et al.
4,111,234 A 9/1978 Wells et al.
(Continued)

FOREIGN PATENT DOCUMENTS

CN 106273533 6/2018
CN 212840102 3/2021
(Continued)

OTHER PUBLICATIONS

Altair.com [online], "Fully Automated in a Single Process: Optimization & Manufacturing of CFRP Components," Altair, retrieved on Oct. 17, 2019, from URL: <https://www.altair.com/ResLibDownload.aspx?file_id2-3669>, 2 pages.
(Continued)

*Primary Examiner* — Mohammad M Ameen
(74) *Attorney, Agent, or Firm* — Fish & Richardson P.C.

(57) ABSTRACT

This disclosure describes a reinforced thermosetting resin piping system that is protected from external impact and UV damage by an outer polyurea-based layer. The embodiments described herein can be favorably used for underground and aboveground applications. In some implementations, an RTR pipe includes a core layer that includes a resin and fibers, an outer layer that includes a polyurea-based layer, and an interface layer between the core layer and the outer layer. The methods described herein also outline the process of producing the pipe structure.

8 Claims, 4 Drawing Sheets

(51) Int. Cl.
*B32B 1/08* (2006.01)
*B32B 5/02* (2006.01)
*B32B 27/12* (2006.01)
*B32B 27/40* (2006.01)
*B32B 37/15* (2006.01)
*C03C 25/36* (2006.01)
*F16L 9/12* (2006.01)
*B29K 63/00* (2006.01)
*B29K 309/08* (2006.01)
*B29L 23/00* (2006.01)
*F16L 57/06* (2006.01)
*F16L 58/00* (2006.01)

(52) U.S. Cl.
CPC ... *B32B 2260/021* (2013.01); *B32B 2260/046* (2013.01); *B32B 2262/101* (2013.01); *B32B 2305/076* (2013.01); *B32B 2305/08* (2013.01); *B32B 2305/10* (2013.01); *B32B 2305/72* (2013.01); *B32B 2307/554* (2013.01); *B32B 2307/558* (2013.01); *B32B 2307/71* (2013.01); *B32B 2315/08* (2013.01); *B32B 2363/00* (2013.01); *B32B 2375/00* (2013.01); *B32B 2597/00* (2013.01); *F16L 57/06* (2013.01); *F16L 58/00* (2013.01)

(56) References Cited

U.S. PATENT DOCUMENTS

| | | | |
|---|---|---|---|
| 4,529,139 | A | 7/1985 | Smith et al. |
| 4,588,538 | A | 5/1986 | Chung et al. |
| 4,653,782 | A | 3/1987 | Munday |
| 4,749,534 | A | 6/1988 | Robertson |
| 4,822,444 | A | 4/1989 | Weingart et al. |
| 4,838,971 | A | 6/1989 | Cacak |
| 4,997,503 | A | 3/1991 | Bohannan et al. |
| 5,128,198 | A | 7/1992 | Dyksterhouse |
| 5,171,630 | A | 12/1992 | Muzzy et al. |
| 5,540,797 | A | 7/1996 | Wilson |
| 5,711,639 | A | 1/1998 | Tessier et al. |
| 5,936,861 | A | 8/1999 | Jang et al. |
| 6,179,945 | B1 | 1/2001 | Greenwood et al. |
| 6,558,146 | B1 | 5/2003 | Shah et al. |
| 6,581,644 | B1 * | 6/2003 | Monette ............ F16L 9/12 138/125 |
| 6,737,134 | B2 | 5/2004 | Friedrich et al. |
| 7,815,141 | B2 | 10/2010 | Uozumi et al. |
| 7,905,442 | B2 | 3/2011 | Uozumi et al. |
| 9,757,905 | B2 | 9/2017 | Harasin et al. |
| 9,937,673 | B1 | 4/2018 | Oakes, III et al. |
| 10,563,807 | B2 | 2/2020 | Vinokurov et al. |
| 2002/0004116 | A1 * | 1/2002 | Friedrich ............ B32B 27/42 428/36.9 |
| 2002/0148553 | A1 | 10/2002 | Campbell, Jr. |
| 2008/0017263 | A1 | 1/2008 | Robinson et al. |
| 2014/0050862 | A1 | 2/2014 | Borger |
| 2014/0328963 | A1 | 11/2014 | Mark et al. |
| 2015/0259805 | A1 * | 9/2015 | Nooren ............ B32B 5/026 252/388 |
| 2015/0360423 | A1 | 12/2015 | Torres et al. |
| 2016/0144566 | A1 | 5/2016 | Mark et al. |
| 2018/0229429 | A1 | 8/2018 | Tyler et al. |
| 2019/0009472 | A1 | 1/2019 | Mark |
| 2020/0086563 | A1 | 3/2020 | Budge |
| 2020/0086571 | A1 | 3/2020 | Castillo et al. |
| 2020/0306869 | A1 | 10/2020 | Hardwick et al. |
| 2021/0041052 | A1 | 2/2021 | Furcoiu |
| 2021/0178659 | A1 | 6/2021 | Fakiri et al. |
| 2021/0178669 | A1 | 6/2021 | Fakiri et al. |
| 2021/0187817 | A1 | 6/2021 | Al-Hashmy et al. |

FOREIGN PATENT DOCUMENTS

| | | |
|---|---|---|
| DE | 102014100711 | 7/2015 |
| EP | 2324994 | 5/2011 |
| EP | 3219474 | 9/2017 |
| JP | S5547351 | 3/1980 |
| WO | WO 2008033504 | 3/2008 |
| WO | WO 2015024363 | 2/2015 |
| WO | WO 2016038429 | 3/2016 |
| WO | WO 2016107808 | 7/2016 |
| WO | WO 2017100991 | 6/2017 |
| WO | WO 2017137233 | 8/2017 |
| WO | WO 2018042205 | 3/2018 |
| WO | WO 2018189062 | 10/2018 |

OTHER PUBLICATIONS

Colombo et al., "Optimization of filament winding parameters for the design of a composite pipe," Composites Part B: Engineering, vol. 148, Sep. 2018, 207-216, 28 pages.

Dti.dk [online], "3D printed cylinders make sewer pipe repairs more efficient" Sep. 2021, [retrieved on Sep. 29, 2021], retrieved from : URL <https://www.dti.dk/specialists/3d-printed-cylinders-make-sewer-pipe-repairs-more-efficient/41745>, 3 pages.

Frketic et al., "Automated manufacturing and processing of fiber-reinforced polymer (FRP) composites: An additive review of contemporary and modern techniques for advanced materials manufacturing," Additive Manufacturing, 14, pp. 69-86, Jan. 2017, 61 pages.

Gonzalez-Henriquez et al., "3.21 Filament Winding Applications," Comprehensive Composite Materials II, vol. 3, 2018, 556-577, 22 pages.

Koustas et al., "On the development of a filament winding robotic system," Procedia Manufacturing, 2018, 17: 919-926, 8 pages.

Manz [online], "Fully Automated in a Single Process: Optimization & Manufacturing of CFRP Components," Altair, retrieved on Oct. 17, 2019, from URL: <https://www.altair.com/ResLibDownload.aspx?file_id2-3669>, 4 pages.

Minsch et al., "Analysis of Filament Winding Processes and Potential Equipment Technologies," Procedia CIRP, 66, 2017, 125-130, 6 pages.

Munro, "Review of manufacturing of fiber composite components by filament winding" Polymer Composites, 9(5): 352-359, Oct. 1988, 8 pages.

Yang et al., "3D printing for continuous fiber reinforced thermoplastic composites: Mechanism and performance," Rapid Prototyping Journal, 23(1): 209-215, Jan. 2017, 7 pages.

* cited by examiner

RESIN RICH POLYUREA-BASED INTEGRATED EXTERNAL LAYER FOR REINFORCED THERMOSETTING RESIN PIPING PROTECTION

TECHNICAL FIELD

This document relates to a fiber reinforced composite piping (FRP) system with improved impact resistance performance for carrying water and high aromatic content hydrocarbons at designated temperatures and high pressures. An integrated manufacturing process of producing the FRP pipe with a polyurea (PU) resin impregnated fiber layer is also described.

BACKGROUND

A need exists for an impact resistant reinforced thermosetting resin pipes, (RTR), an FRP piping system as they are susceptible to impact damage. In the Oil and Gas Industry, these pipes are utilized in on-plot and off-plot areas and in most cases, they are buried. Whether it is a buried or aboveground system, impact performance always exhibits challenges in operations for the end users. However, a buried pipe exhibits elevated challenges as it prohibits simple on-stream visual inspection against incurred impact damage and may impose challenges in detecting and repairing a leak. Therefore, a non-metallic pipe that is impact-resistant and can be used in both underground and aboveground applications is desirable.

SUMMARY

This disclosure describes a reinforced thermoplastic resin pipe that is protected from abrasion, impact damage, and UV damage by an outer polyurea-based layer.

In some implementations, a pipe includes a core layer, an outer layer, and an interface layer between the core layer and the outer layer. The core layer includes a resin and fibers. The outer layer includes a polyurea-based layer.

This aspect, taken alone or combinable with any other aspect, can include the following features. The resin includes a polyester-, vinylester-, or epoxy-based resin.

This aspect, taken alone or combinable with any other aspect, can include the following features. The fibers include glass rovings or carbon fiber.

This aspect, taken alone or combinable with any other aspect, can include the following features. The glass rovings include e-glass or ECR glass.

This aspect, taken alone or combinable with any other aspect, can include the following features. The outer layer includes fibers.

This aspect, taken alone or combinable with any other aspect, can include the following features. The fibers are glass rovings.

This aspect, taken alone or combinable with any other aspect, can include the following features. The glass rovings are e-glass or ECR glass.

This aspect, taken alone or combinable with any other aspect, can include the following features. The polyurea-based layer includes aliphatic and aromatic functional groups.

This aspect, taken alone or combinable with any other aspect, can include the following features. The core layer is between 5 and 8 mm thick.

This aspect, taken alone or combinable with any other aspect, can include the following features. The outer layer is less than 2 mm thick.

In some implementations, a method of manufacturing a pipe includes immersing fibers or glass rovings in an uncured resin to yield impregnated fibers or impregnated glass rovings, winding the impregnated fibers or impregnated glass rovings over a mandrel, where the impregnated fibers or impregnated glass rovings are wound under tension, partially curing the resin, applying a polyurea-based layer to the partially cured resin, allowing the polyurea-based layer to dry, and completely curing the resin and polyurea-based layer.

This aspect, taken alone or combinable with any other aspect, can include the following features. Immersing fibers or glass rovings in an uncured resin includes immersing fibers or glass rovings in a polyester-, vinylester-, or epoxy-based resin.

This aspect, taken alone or combinable with any other aspect, can include the following features. Immersing fibers or glass rovings in an uncured resin includes immersing e-glass fibers in an uncured resin.

This aspect, taken alone or combinable with any other aspect, can include the following features. Applying the polyurea-based layer to the partially cured resin includes applying the polyurea-based layer.

This aspect, taken alone or combinable with any other aspect, can include the following features. Applying the polyurea-based layer to the partially cured resin includes applying a polyurea-based layer that comprises fibers or glass rovings to the partially cured resin.

This aspect, taken alone or combinable with any other aspect, can include the following features. Applying the polyurea-based layer that includes fibers or glass rovings to the partially cured resin includes applying a polyurea-based layer that comprises e-glass to the partially cured resin.

This aspect, taken alone or combinable with any other aspect, can include the following features. Applying the polyurea-based layer that comprises fibers or glass rovings to the partially cured resin comprises winding the polyurea-based layer that comprises fibers or glass rovings over the partially cured resin.

This aspect, taken alone or combinable with any other aspect, can include the following features. Applying a polyurea-based layer to the partially cured resin includes applying a polyurea-based layer that includes aliphatic and aromatic functional groups.

This aspect, taken alone or combinable with any other aspect, can include the following features. Winding the impregnated fibers or impregnated glass rovings over a mandrel includes winding a layer of impregnated fibers or impregnated glass rovings that is between 5 mm and 8 mm thick over a mandrel.

This aspect, taken alone or combinable with any other aspect, can include the following features. Applying a polyurea-based layer to the partially cured resin includes applying a polyurea-based layer that is less than 2 mm thick.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter. This disclosure describes a reinforced thermosetting resin piping system that is protected from external impact and UV damage by an outer polyurea-based layer. The embodiments described herein can be favorably used for underground and aboveground applications. In some implementations, an RTR pipe includes a filament wound RTR pipe as a core pipe and an outer layer made of PU impregnated fibrous system with improved impact performance. In some implementations, a PU resin system is utilized on an already cured composite repair system. The methods described herein also outline the process of producing the pipe structure. In the piping component, an additional external layer will not introduce any adverse effect on the joints and it will remain in effect after the joints are made in the field.

As per the present disclosure, a multi-layer RTR piping system coupled with a PU impregnated impact resistant layer and a method for manufacturing the components of the piping system is disclosed. RTR core pipe has been manufactured by impregnating fibrous material (i.e. glass fibers or carbon fibers) with an uncured thermosetting resin (i.e. epoxy or vinylester or polyester). In some instances, resin-rich corrosion barrier layer is included to protect the core pipe (reinforced thermosetting resin pipe) from wear and chemical attack. Based on the pressure rating, thickness of the pipe can be increased and PU resin is applied along the length of the pipe when the pipe still remains in tacky state. Glass fiber is wound along the axis of the pipe with a lower weight fraction to develop a strong bonding and better interface. Jointing either through mechanical and adhesive bonding does not have any adverse effect on the external layer integrity as PU is applied in full length for the female section and until the joint zone for the male section.

Figure 1:
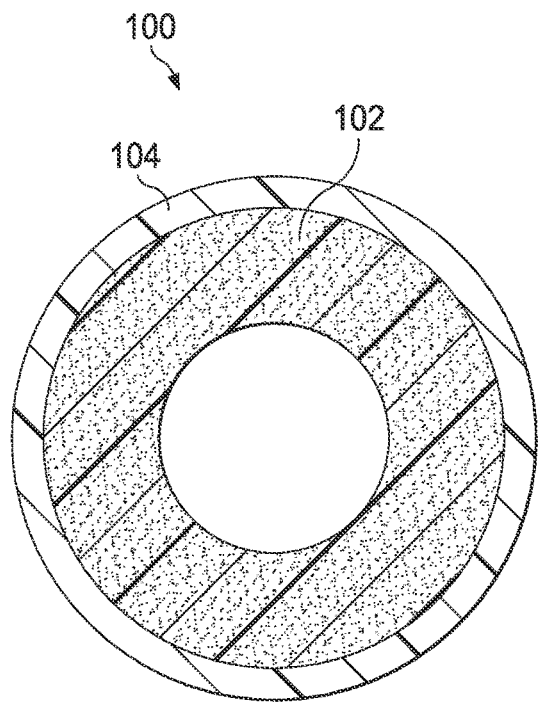
FIG. 1 shows an example schematic of a cross section of a reinforced pipe.

Provided in this disclosure, in part, are multi-layered reinforced thermosetting resin (RTR) pipes with an external impact resistance layer and methods for making the same. FIG. 1 illustrates an example cross-sectional schematic of a RTR pipe 100. The pipe 100 is suitable for use in a number of industrial applications. For example, the pipe can be stable in the presence of aquifer and sea water system, chemicals, or aqueous-based fluids. In some implementations, the pipe 100 can be used to transport liquid hydrocarbons, gas condensate, or oily water without degradation or leaking. In some implementations, the pipe 100 can be used as a downhole tubular to transport water under high pressure.

The RTR pipe 100 according to the present invention includes a core layer 102 and an outer layer 104. The outer layer 104 can be PU based. The core layer 102 includes a thermosetting resin, i.e., a polyester-, vinylester-, or epoxy-based resin as a matrix and either glass or carbon fiber to be utilized as reinforcement. In some implementations, the core layer 102 can be between 5 to 8 mm thick for 4" (10.16 cm) to 20" (50.8 cm) pipe based on the pressure rating. 5 mm minimum thickness has been chosen specifically for lower pressure smaller diameter pipes since most of the pipes are jointed by adhesive bonding and during jointing end preparation, shaving may cause imperfections if installation work is not done properly. The diameter of the pipe can be varied based on the process requirement while thickness varies based on the design pressure and associated jointing method. This structure is applicable to all diameter pipes where the core layer 102 will carry the fluid and act as a pressure containment. Additionally, the core layer 102 provides a stable and structurally sound base for the reinforced pipe 100.

Figure 2:
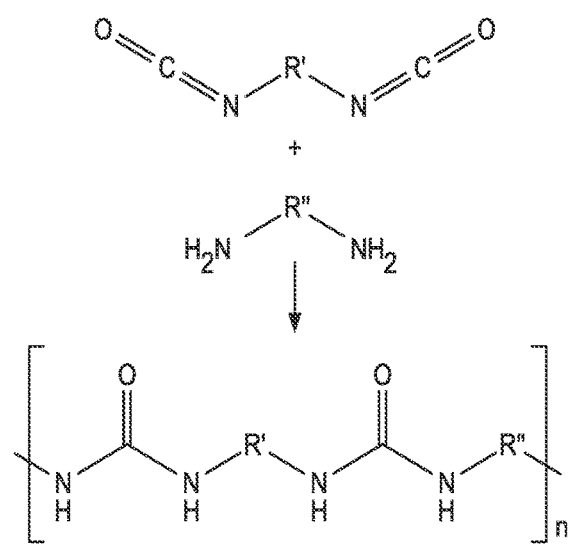
FIG. 2 shows an example reaction between a diisocyanate and a polyamine to form a polyurea.

The pipe 100 also includes an outer layer 104. The outer layer 104 can include a polyurea-based compound impregnated fiber. The polyurea-based layer can provide resistance to impact damage and abrasion/wear as well as resistance to exposure from ultraviolet (UV) light. In some implementations, the polyurea-based compound can be synthesized by the reaction of an isocyanate with an amine blend (component A), for example a diisocyanate and a polyamine (component B). FIG. 2 shows an example reaction of a diisocyanate with a polyamine to yield a polyurea. This amide has two —$NH_2$ groups joined by a carbonyl (C=O) functional group. In some implementations, the diisocyanate is an aliphatic compound, for example where R' is an aliphatic group. In some implementations, the diisocyanate is an aromatic compound, for example where R' is an aromatic group. In some implementations, the polyurea-based layer is formed with a mixture of aliphatic and aromatic isocyanates. The R" group can be an aliphatic or aromatic moiety. Accordingly, the polyurea-based layer can include a mixture of aliphatic and aromatic functional groups. The aliphatic groups yield better UV resistance than aromatic groups. Therefore, a polyurea-based layer that includes predominantly aliphatic groups can be resistant to UV damage.

In some implementations, the polyurea based layer can include other additives or functional groups to further improve the properties of the pipe. For example, RTR pipe used in aboveground on-plot area, specifically outside of utility zone, often requires to be fire resistant or retardant to improve the passive safety factor. A fire-resistant compound is beneficial in situations where excess heat or flame is present as it will provide assurance of pipe integrity in case of fire. In order to improve its fire characteristics, PU may be mixed with flame-retardant (FR) additives that retard flame and suppress smoke development. Specific examples include brominated or phosphorous-based flame retardant compounds.

In some implementations, the outer layer 104 can be 2 mm or more thick. In some implementations, the outer layer 104 can be equal to or less than 2 mm thick. Impact performance of the piping system varies with PU layer thickness. Therefore, with a thicker layer, the impact performance improves as it improves the ultimate energy absorption of the entire system. Thicker PU layer is required in locations where the pipe may be exposed to potential higher external load. Accordingly, the pipe at designated impact zone (i.e. future construction zone, crane and heavy equipment movement zone) can be made with higher thickness rather than designing the entire system with same thickness. The proposed invention accommodates to join the dissimilar pipe either in low or high pressure system while ensuring the cost of constructing the system remains cost-effective.

In some implementations, multi-layer RTR piping system coupled with a PU impregnated impact resistant layer is presented where RTR pipe forms the core piping structure. Precisely, the proposed multilayer pipe consists of three layers that include internal corrosion barrier layer, a core pipe layer and a PU impregnated impact resistant layer. In some implementations, the core pipe acts as a fluid barrier and pressure containment while the external PU layer may improve pressure capability but its main function is to provide cushion against impact.

Figure 3:
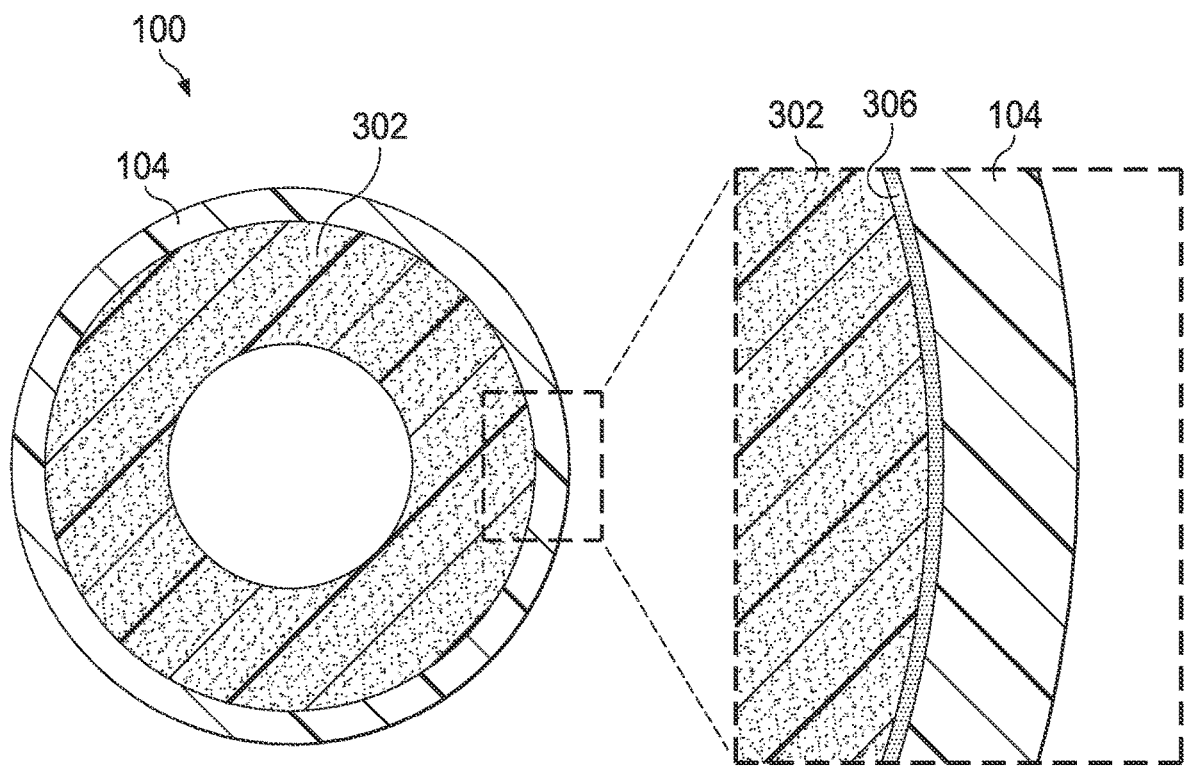
FIG. 3 shows an example schematic of a cross section of a reinforced pipe that includes fibers or glass rovings in the core section.

The RTR pipes described herein can be manufactured by impregnating fibrous material (i.e. glass fibers or carbon fibers) with an uncured thermosetting resin (i.e. epoxy or vinylester or polyester) utilizing a conventional filament winding machine. In some implementations, the pipe can include a resin-rich corrosion barrier layer to protect the core pipe (RTR) from wear and chemical attack. This layer comes in direct contact with the conveyed fluid and typically vinylester is used to ensure maximum resistance against chemical corrosion and erosion. In some implementations, the internal liner thickness is kept as minimal as 0.8 mm to 1.2 mm. For example, FIG. 3 shows an example cross-sectional schematic of a pipe 100 that includes fibers or glass rovings which is used to manufacture the core pipe. In some implementations, the fiber rich core layer 302 can be between 5 and 8 mm thick based on the required pressure rating and jointing system being utilized for the stated application. In some implementations, the fiber rich core layer 302 includes glass rovings, for example E-glass or ECR glass. E-glass is resistant to chemicals where it shows very high mechanical properties. ECR glass fiber is similar to E-glass but without boron and fluorine which yields an enhanced resistance capability against several chemicals including water, acid and alkali. Glass fiber in the fiber rich core layer 302 is applied in different forms depending upon the manufacturing process and design load requirements. In the gravity-fed or low pressure piping system some chopped fiber can be utilized in core layer 302, where fiber rovings wound on the pipe provides the required strength. The actual fiber content in a composite depends on the end use design. The fiber orientation, the layup sequence of the laminate, and the number of reinforcements determine the actual pipe stiffness, strength, and mechanical properties. The fibers or glass rovings in the fiber rich core layer 302 improves the stability and structural integrity of the pipe. In addition, the fibers or glass rovings can improve the adhesion between the fiber rich core layer 302 and the outer layer 104. As shown in FIG. 3, the glass rovings contribute to an interface 306 between the fiber rich core layer 302 and the outer layer 104. The fibers in the fiber rich core layer 302 can project into the polyurea based outer layer 104 and improve the stability of the adhesion between the two layers. Accordingly, the interface 306 enhances the adhesion and stability of the layered structure.

In some implementations, the outer layer can include fibers or glass rovings, for example fiberglass or e-glass. Accordingly, the pipe can include any combination of resin-rich inner layer, core layer with glass fibers, and an outer layer with or without fibers or glass rovings. For example, the pipe 100 can include a core layer with and without inner resin layer and an outer layer without glass rovings. Alternatively or in addition, the pipe 100 can include a core layer with and without inner resin layer and an outer layer with glass rovings. The inclusion of fibers or glass rovings in the outer polyurea layer further enhances the stability of the interface between the core and the outer layer. In addition, the fibers or glass rovings can improve the stability and integrity of the outer layer itself.

Figure 4:
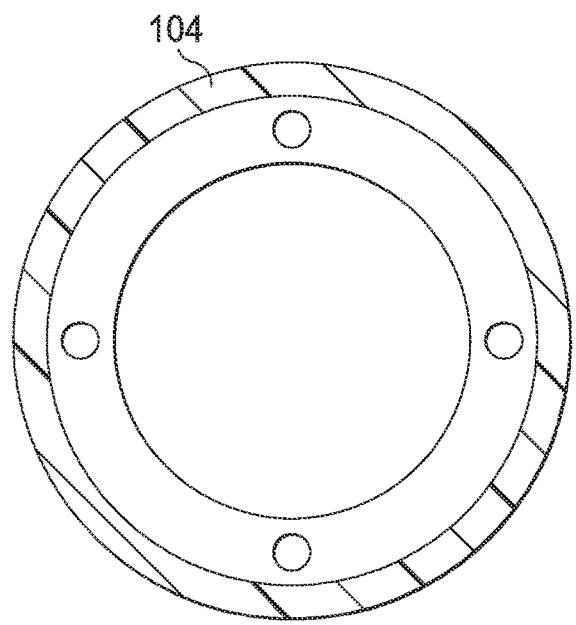
FIG. 4 shows an example schematic of a cross section of a contact-molded flange with a polyurea based coating.

In some implementations, the pipe includes flanges and specifically in the end-termination. The flanges can be molded by hand or contact molded or even can be fabricated through filament wound. In some implementations, the polyurea layer will also be applied to the molded flange. FIG. 4 shows an example of a cross-sectional schematic of a contact-molded flange with a polyurea outer layer 104. The polyurea-based layer is applied to the fiber reinforced flange and can be applied through hand spray, if not manufactured in the winding machine. In case of hand spray technique, chopped fiber will be utilized to fabricate polyurea outer layer 104. Alternatively, if the flange is fabricated through filament winding, glass roving will be applied and wound on the pipe at same angle as core pipe but with a reduced number of rovings.

The pipe 100 can be formed using a filament winding manufacturing process. A corrosion barrier resin-rich layer can be made with resin reinforced with C-glass or synthetic veil. In some implementations, vinylester resin is used as component of the resin rich layer as part of the core pipe. Corrosion barrier layer protects the helically wound continuous glass fibers of the core layer from corrosion. The hardener system (i.e. amine or aliphatic) and resin (i.e. polyester, vinylester or epoxy) is selected based on the end product properties. The glass reinforcement in the form of nonstop roving (i.e. E-glass, ECR-Glass) is selected based on the chemical resistance requirements and its compatibility with the selected epoxy resin system. Glass fiber in pipe 100 is impregnated with aromatic- or cyclo-aliphatic amine cured epoxy resin. The pipe 100 layer is manufactured using a filament winding manufacturing process. In this process, continuous glass fiber rovings are impregnated with the selected resin system. In the first step, a steel mandrel whose dimensions define the pipe and fittings is prepared. Glass fibers are pulled through a liquid resin bath pre-mixed with hardener, and are wound under constant tension at a pre-defined angle around the mandrel. In some implementation, glass fibers are wound at a ±55 degree angle. Once the desire thickness based on the pressure class is reached, the winding process completes. In some implementations, PU resin is applied after the winding process without the utilization of glass fiber while the product is still in tacky state. In some implementations, PU is applied in the similar fashion however, glass fiber is continuously wound along with the PU layer where the number of rovings is reduced.

Figure 5:
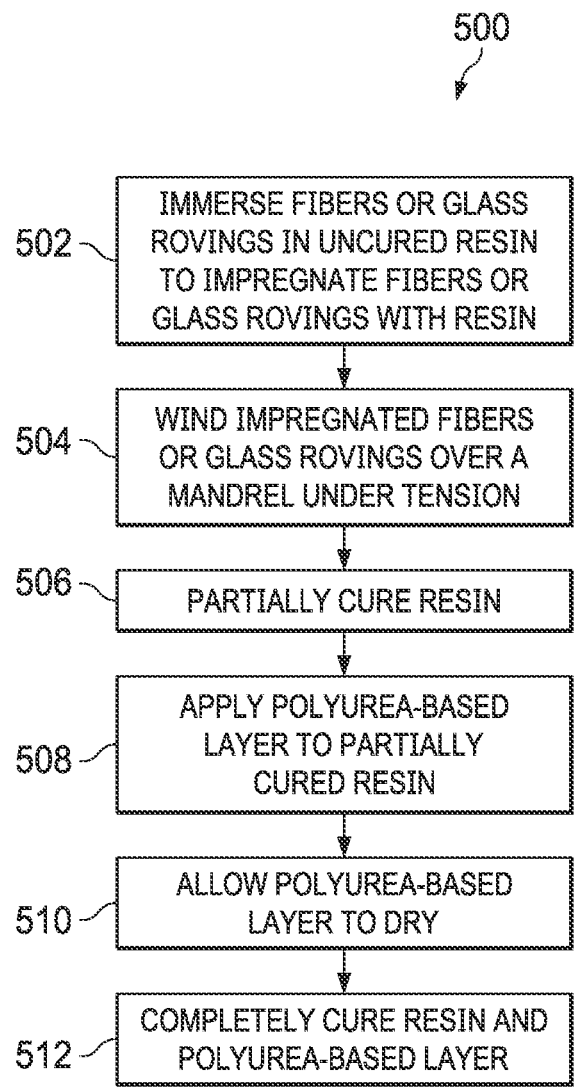
FIG. 5 is a flow chart of an example method of making a reinforced pipe.

FIG. 5 shows an example flow diagram of a method 500 of producing a pipe 100. At 502, fibers or glass rovings are immersed in an uncured resin (i.e., a polymer), to impregnate the rovings with uncured resin premixed with hardener. The length of rovings are pre-set according to pipe pressure rating and longer lengths rovings are made by binding one end of the strand with the other either by pneumatically or manually.

At 504, the impregnated fibers or glass rovings are wound over a mandrel under tension. At 506, the uncured resin is dried and partially cured at ambient conditions, for example at room temperature. When the resin is partially cured, it can maintain its structure but it will be kept as tacky or sticky.

At 508, the polyurea-based layer is then applied to the partially cured resin. Because the resin is only partially cured, the polyurea layer binds well to the resin and the glass rovings embedded in the resin, forming the cohesive interface structure once the polyurea layer. At 510, the polyurea-based layer is allowed to dry. At 512, after the polyurea layer is sufficiently dry, the resin and the polyurea layer are completely cured, under the conditions necessary to completely cure both the resin and the polyurea based liner. However, PU curing time depends upon the formulation.

In some implementations, the polyurea based outer layer 104 includes glass rovings and can be applied in-line using a filament winding process. For example, the polyurea-based outer layer 104 can be applied while the filament winding process will be running with a reduced number of glass fibers at the same winding angle over the partially cured RTR core layer pipe and mandrel. The number of layers is reduced as the external layer will not be utilized for structural performance enhancement while continuous fiber layer until the entire diameter of the piping system will yield an enhanced interface and aid to avoid any delamination during operation at higher impact zone. In some implementations, the polyurea based layer does not include glass rovings and can be applied after the RTR pipe is fully cured while using any wet coating process. Polyurea has a faster reaction time and thus it avoids reacting with humidity and can be applied in a humid condition as well. When required, the polyurea curing time can be lowered by slowing down the gel times.

In some implementations, the polyurea layer can be applied to a carbon steel pipe repaired with composite. For example, once the structural integrity of a corroded carbon steel pipe is restored by utilizing composite repair, either glass or carbon fiber reinforced epoxy, the polyurea based layer can be applied to the repaired section either during the wet lay-up process or after the completion of the curing while achieving desired degree of hardness. In some implementations, a polyurea layer can be applied in the field during a humid condition, and the substrate and composite wrap will not exhibit any issues and develop a strong bonding structure in a moist environment.

Figure 6A:
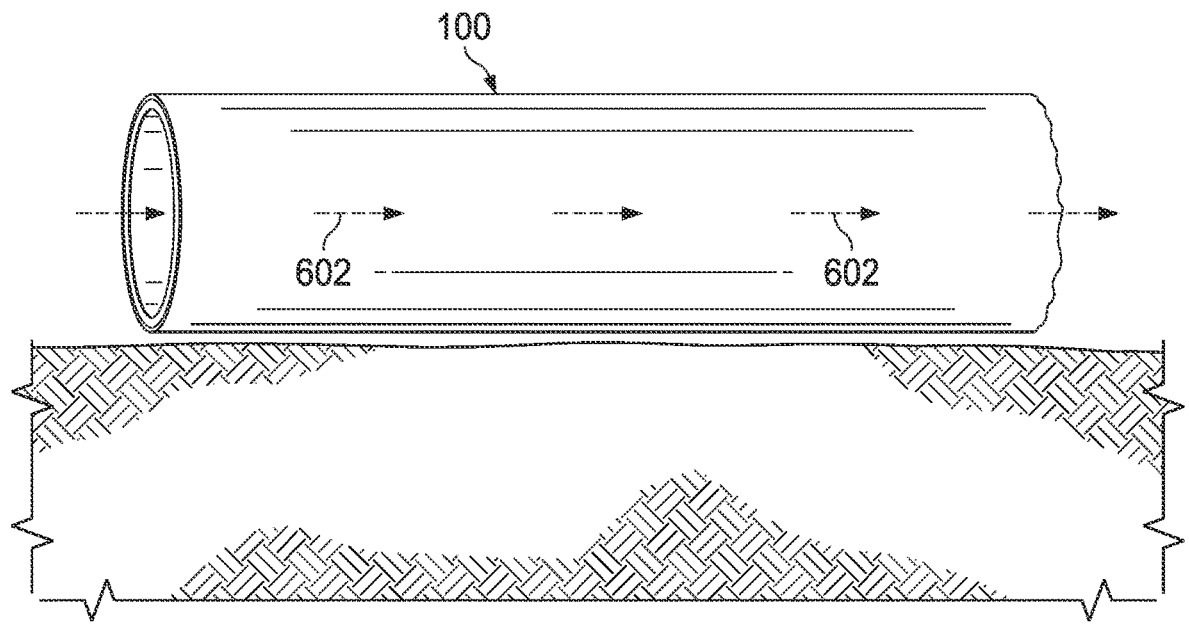
FIG. 6A shows an example schematic of using the pipe 100 above ground.
Figure 6B:
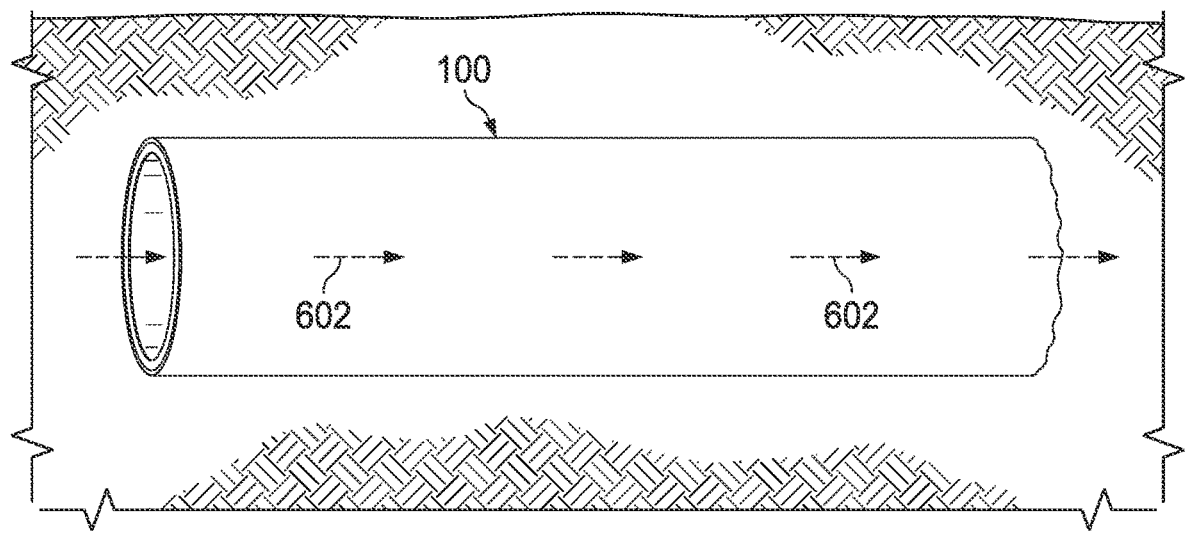
FIG. 6B shows an example schematic of using the pipe 100 below ground.

FIG. 6A shows an example schematic of using the pipe 100 above ground. The pipe 100 can be used to transport a fluid 602 over a distance. For example, the fluid can be low pressure water, or chemicals. FIG. 6B shows an example schematic of using the pipe 100 below ground. The pipe 100 can be used to transport a fluid 602 underground. For example, the fluid can be a low pressure oily water, high pressure water, or a liquid hydrocarbon system. The pipe 100 can also be used above ground and below ground in combination, for example, where a first section of the pipe is above ground and a second section of the pipe is below ground. Advantageously, the pipe 100 to be laid in the aboveground set-up can incorporate UV inhibitors to protect it from the ultraviolet effect. As the underground pipe stiffness will be dictated by corelayer 302, the pipes described herein will have either similar or slightly better structural performance against external loads due to traffic loads.

The following examples illustrate the implementation of the novel manufacturing method and its application.

Example 1

The filament winding procedure was used to make an RTR pipe with epoxy and glass fiber reinforcement. RTR that has been utilized in this example was anhydride cured and can be primarily used in low-pressure applications. Polyurea was then applied into the RTR pipe while it was still in sticky condition. The layer was placed to a tacky substrate to improve interlaminar bonding, and after curing, good interface bonding with no or minor wrinkles was observed. After curing, this method produces a pipe with a monolithic structure and no delamination.

Example 2

Threaded joints can be used for hydrocarbon applications since the male and female engagement areas will not be altered, allowing a whole spool of 12 m length to be made using the same technique as in Example 1.

Example 3

The use of power tongs during the installation of high-pressure RTR pipe can damage the pipe surface. The metallic grips can make an indentation on the outer surface, but only a little layer on the top of a standard RTR pipe. Since polyurea can withstand significantly higher external impact, the pipe's performance remained unaffected. The affected pipe zone, on the other hand, can be restored in the field, if needed using a polyurea spray approach.

Example 4

A few 6" (15.24 cm) RTR pipes were made using a standard filament winding procedure that used epoxy resin and E-glass and was wound at a 55° angle. After the pipe was semi-cured but still tacky, a PU layer was applied and cured as described herein. In order to demonstrate the effect of a 2 mm polyurea-based layer on a reinforced thermoplastic resin (RTR) pipe, an impact study was undertaken. By striking the pipe with a drop weight, both coated and non-coated RTR/glass reinforced epoxy (GRE) pipes were tested. The kinetic energy of the impact was varied by altering the height of the drop weight. For an initial study, each pipe was impacted at numerous locations (9) before being visually inspected and hydrotested. Pipes were typically hydrotested at 1.5× maximum permissible operating pressure (MAOP), however in this case, tests were conducted at 3.5×MAOP per API 15LR at ambient temperature to accelerate the small damage to develop and propagate a crack. The pipe was tested according to API 15LR while it was full of water and not pressurized. A steel ball with a diameter of 2" (5.08 cm) and a weight of 1.2 pounds (0.54 kg) was used in the impact tests, which were supported by a flat pipe. The pipe had evident impact damage up to 750 mm without the PU covering, yet it passed the hydrotest. From practical field experience, it can be deduced that the 50% of pipes that have received impact damage, notably at 750 mm drop height, will fail over the course of 5 to 10 years in service, as the damage will spread over time. From 750 mm and up, tests were carried out at five different heights, and all of the pipe surfaces showed either obvious substantial damage and cracking of the structural wall or significant damage with cracking throughout the cross-section, and all of the pipes failed hydrotesting. The RTR pipe with the PU layer, on the other hand, showed no visible flaws and no further delamination or liner breaking. All of the RTR pipes with a PU layer withstood the hydrotest and testing at all of the drop heights revealed no visible damage. Polyurea demonstrated outstanding impact performance for various thin plate steel parts and concrete structures, and the current findings revealed that impact resistance performance of the product can be improved even with a less ductile substrate, while the core pipe showed no anomalies.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

A number of implementations of the disclosure have been described. Nevertheless, it will be understood that various modifications may be made without departing from the spirit and scope of the disclosure.

What is claimed is:

1. A method of manufacturing a pipe, comprising:
   immersing fibers or glass rovings in an uncured resin to yield impregnated fibers or impregnated glass rovings;
   winding the impregnated fibers or impregnated glass rovings over a mandrel, wherein the impregnated fibers or impregnated glass rovings are wound under tension;
   partially curing the resin;
   applying a polyurea-based layer to the partially cured resin, applying the polyurea-based layer to the partially cured resin comprises applying a polyurea-based layer that comprises fibers or glass rovings to the partially cured resin;
   forming an interface between the partially cured resin and the polyurea-based layer, wherein in the interface the impregnated fibers or impregnated glass rovings in the partially cured resin project into the polyurea-based layer;
   allowing the polyurea-based layer to dry; and
   completely curing the resin and polyurea-based layer.

2. The method of claim 1, wherein immersing fibers or glass rovings in an uncured resin comprises immersing fibers or glass rovings in a polyester-, vinylester-, or epoxy-based resin.

3. The method of claim 1, wherein immersing fibers or glass rovings in an uncured resin comprises immersing e-glass fibers in an uncured resin.

4. The method of claim 1, wherein applying the polyurea-based layer that comprises fibers or glass rovings to the partially cured resin comprises applying a polyurea-based layer that comprises e-glass to the partially cured resin.

5. The method of claim 1, wherein applying the polyurea-based layer that comprises fibers or glass rovings to the partially cured resin comprises winding the polyurea-based layer that comprises fibers or glass rovings over the partially cured resin.

6. The method of claim 1, wherein applying a polyurea-based layer to the partially cured resin comprises applying a polyurea-based layer that includes aliphatic and aromatic functional groups.

7. The method of claim 1, wherein winding the impregnated fibers or impregnated glass rovings over a mandrel comprises winding a layer of impregnated fibers or impregnated glass rovings that is between 5 mm and 8 mm thick over a mandrel.

8. The method of claim 1, wherein applying a polyurea-based layer to the partially cured resin comprises applying a polyurea-based layer that is less than 2 mm thick.

* * * * *